Aug. 16, 1932.  S. L. GOLDSBOROUGH  1,871,787
OVERLOAD RELAY
Filed Dec. 12, 1930
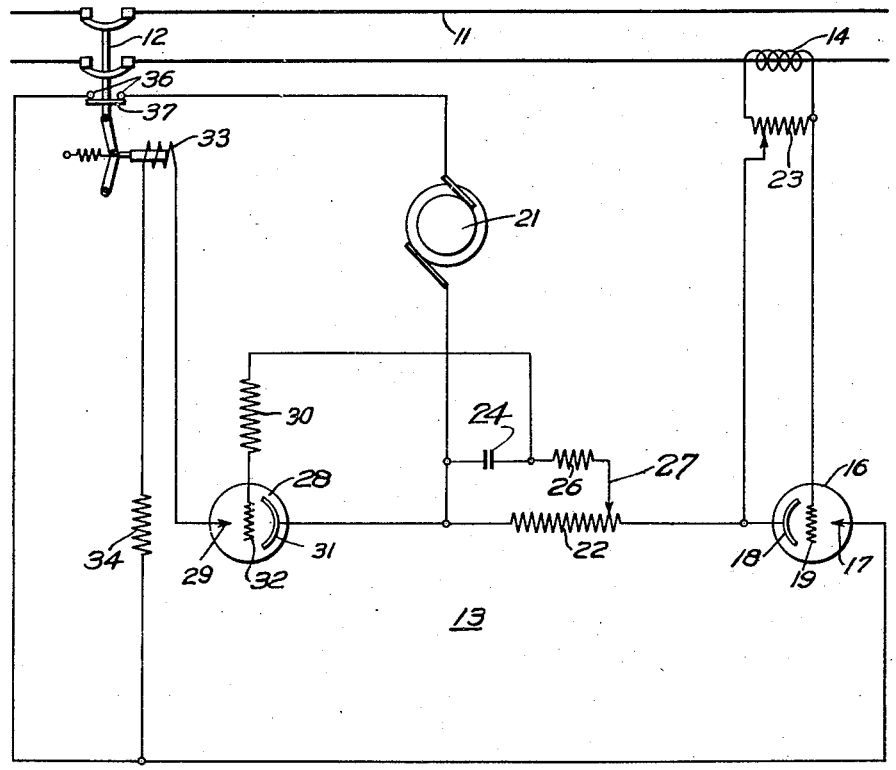
WITNESSES:
INVENTOR
Shirley L. Goldsborough
BY
ATTORNEY Patented Aug. 16, 1932

1,871,787

UNITED STATES PATENT OFFICE

SHIRLEY L. GOLDSBOROUGH, OF EAST ORANGE, NEW JERSEY, ASSIGNOR TO WESTINGHOUSE ELECTRIC & MANUFACTURING COMPANY, A CORPORATION OF PENNSYLVANIA

OVERLOAD RELAY

Application filed December 12, 1930. Serial No. 501,882.

The present invention relates to time-overload relays and comprises a simple and inexpensive low-energy protective apparatus.

For alternating-current-system protection, where a definite time-overload characteristic is desired, the usual relay apparatus comprises an induction-type relay and a torque-compensating means associated therewith. Other types of definite time-delay relays are usually provided with mechanical restraining means, such as bellows or dash-pots.

In the present invention, the uncertain mechanical operation of usual relay apparatus is obviated, and the operating energy required is materially reduced thereby resulting in a simplified and inexpensive relay means having a definite time delay in its operation. To provide relay apparatus of this character, plural-electrode electric-discharge tubes or grid-glow tubes are utilized in conjunction with a capacitance means for providing any desired time delay.

Grid-glow tubes, suitable for the protective purposes contemplated in the present invention, are provided with the usual anode and cathode elements and a grid control element, the potential on which may be controlled in any desired manner.

For a full understanding of the operation and advantages of the present invention, reference is made to the accompanying drawing wherein one modification of the proposed overload-relay apparatus is disclosed.

An alternating-current circuit 11 is provided with a circuit interrupter 12 and control apparatus 13, electrically associated with the alternating-current circuit 11 and the circuit interrupter 12, to effect the opening of the circuit interrupter upon the occurrence of an overload of predetermined magnitude or a fault on circuit 11.

A current transformer, having a secondary winding 14, is associated with one conductor of circuit 11, and the terminals of the winding 14 are connected to the grid control circuit of a grid-glow tube 16. The grid-glow tube is shown conventionally as comprising an anode 17, cathode 18 and grid or control electrode 19. As is well known in the art, a potential may be applied to the principal electrodes, or the anode 17 and the cathode 18, of the grid-glow tube 16, by any voltage source, such as an independent alternating-current source 21. A relatively high resistance 22 is serially connected to the source 21 and the principal electrodes 17 and 18 for preventing the flow of excess current between the principal electrodes after the grid-glow tube 16 has broken down.

The grid or control circuit, including control electrode 19, is energized in accordance with the current traversing the circuit 11, by means of the current-transformer secondary winding 14, and the grid circuit is completed, through a high variable resistance 23, to the cathode 18 of the grid-glow tube 16.

The variable resistance 23 is provided for effecting any desired current flow in the grid or control circuit of the grid-glow tube 16 and, in practice, this current is made very small in order to lengthen the life of the tube 16.

During normal system conditions on the circuit 11, the energization of the grid or control circuit of the grid-glow tube 16 is insufficient to complete the ionization of the path between the principal electrodes 17 and 18, and there is no glow discharge across the principal electrodes. However, as a result of a predetermined overload on circuit 11, the grid 19 is energized to complete the ionization of the path between the principal electrodes 17 and 18, and a resultant glow discharge appears across the anode 17 and the cathode 18.

As referred to hereinbefore, the value of the resistance 22 is so chosen to limit the current flowing between the principal electrodes 17 and 18 that an arc is not formed therebetween. A condenser 24 is connected in series with a high resistance 26, and this series circuit is energized in accordance with the potential drop across the resistance 22 by means of potentiometer connection 27. In this manner, the condenser 24 is charged at a rate depending upon the potentiometer adjustment 27. The time required to charge the condenser 24 is dependent upon the size of the condenser 24 and the value of the resistance 26.

Assuming any particular value of capacitance 24 and resistance 26, a definite time is required, after the break down of the grid-glow tube 16, before the condenser 24 is charged to a predetermined value. A second grid-glow tube 28, having an anode 29, cathode 31 and control grid 32, has the grid control circuit thereof energized in accordance with the charge existing on the condenser 24. To effect this energization of the grid control of the grid-glow tube 28, the grid 32 is connected to one side of condenser 24 through a relatively high impedance 30, and the grid control circuit is completed from the other side of condenser 24 to the cathode electrode 31 of the tube 28. The impedance 30 is provided for the purpose of limiting the current flow in the grid circuit, and results in the increased life of the tube.

The cathode 31 is connected to one terminal of source 21, and the anode 29 is connected to the other terminal of the source through the trip coil 33 of circuit interrupter 12, current-limiting resistor 34, and contacts 36 and pallet switch 37 of the circuit interrupter 12. The combined resistance of the trip coil 33 and the resistor 34 is such as to limit the current flow in the circuit after the break-down of tube 28.

When the condenser 24 has received a predetermined charge, the resultant energization of the grid control of tube 28 effects the break down of tube 28, and the resultant energization of trip coil 33 of the circuit interrupter 12.

The energization of trip coil 33 results in the actuation of circuit interrupter 12 to its open position, thereby opening contacts 36 and isolating the independent alternating-current source 21 to stop the discharge of the grid-glow tubes 16 and 28.

A direct-current source, such as a battery, may be substituted for the independent alternating-current source 21, provided that it is desired to open the circuit interrupter 12 every time a fault or predetermined overload occurs on the system.

However, in many alternating-current systems, to which the present invention is readily applicable, the relay apparatus 13 may not be called upon to open its associated circuit interrupter 12 in the event of fault or overload conditions, because the fault may be cleared by other system relay apparatus. Because of this possibility, the use of an independent alternating-current source is preferable to a direct-current source because the discharge of the grid-glow tubes is interrupted upon the deenergization of the respective grid control circuits, or the return of normal system conditions.

The alternating-current source 21 may be connected directly across the anode and cathode circuits of the respective grid-glow tubes; the contacts 36 and pallet switch 37 being unnecessary unless a direct-current source is utilized to effect the discharge of the tubes.

In the illustrated embodiment of my invention, the resistors 22 and 26 and the connection 27 constitute a discharge path for the condenser 24 when the grid glow tubes 16 and 28 are in substantially non-conducting condition. It will be understood, however, that the discharge means for the condenser 24 may take such other forms as will be obvious to those skilled in the art.

From the foregoing description of the operation of one modification of the present invention, it is apparent that a definite time elapses, after a predetermined overload occurs on system 11, before the trip coil 33 is energized to trip the circuit interrupter 12. The characteristics of the two grid-glow tubes 16 and 28 may be modified, in any desired manner, and the grid control of tube 16 may be varied to respond to any desired overload occurring on circuit 11. In a similar manner, the grid control of tube 28 may be varied by altering the values of the capacitance 24, resistance 26 and/or the potentiometer connection 27.

The grid control circuits of the respective grid-glow tubes 16 and 28 may be altered to provide a circuit between their respective grids and anodes, in contradistinction to the circuits above described with reference to the drawing. Obviously, however, an alteration of the grid control circuits would necessitate other changes in the tube connections and such alterations would readily be apparent to one skilled in the art.

The relative values of resistances utilized in the protective scheme of the present invention depend upon the characteristics of the grid glow tubes, the conditions existing on the circuit to be protected and the independent supply source associated with the anode and cathode electrodes of the respective tubes. Any desired definite time delay may be obtained by changing the value of capacitance, the rate of charge thereof and/or the break-down value of the grid-glow tube, the grid control circuit of which is energized in accordance with the charge on the capacitance.

The present invention is not limited to the specific energizing means disclosed, since it is conceivable that any means for effecting the actuation of the discharge tube 16 may be utilized for providing a desired time delay in a control system. The tube 16 may also be replaced by a suitable rectifying means or the energization of such rectifying means may be made to depend upon the actuation of the discharge tube. Obviously, many modifications of the time-delay control may be made without departing from the spirit and scope of the present invention.

Other modifications for providing protective apparatus to act as an overload relay with a definite time delay, independent of the magnitude of overload current, should be apparent from the modification disclosed, and it is desired that no limitations be imposed on the present invention other than as indicated in the appended claims and necessitated by the prior art.

I claim as my invention:

1. In a protective system, an electric circuit, a circuit interrupter therefor, a condenser, means responsive to an overload on said circuit for varying the charge upon said condenser during said overload at a rate independent of the magnitude of said overload, and means responsive to a predetermined charge upon said condenser for operating said interrupter when said overload continues for a definite time interval.

2. In a protective system, an electric circuit, a circuit interrupter therefor, an electric-discharge device, means responsive to an overload on said circuit for causing said device to pass a current of a magnitude independent of the magnitude of said overload, and means controlled by said current for operating said interrupter when said overload continues for a definite time interval.

3. In a protective system, an electric circuit, a circuit interrupter therefor, an electric discharge device, means responsive to an overload on said circuit for causing said device to pass a current of a magnitude independent of the magnitude of said overload, a second electric discharge device, means responsive to said current for varying a controlling quantity of said second device, and means responsive to a predetermined condition of energization of said second device for operating said interrupter when said overload continues for a definite time interval.

4. In a protective system, an electric circuit, a circuit interrupter therefor, an electric discharge device, energy storage means, means responsive to an overload on said circuit for causing said device to vary the condition of energization of said storage means at a rate independent of the magnitude of said overload, and means responsive to a predetermined condition of energization of said storage means for operating said interrupter when said overload continues for a definite time interval.

5. In a protective system, an electric circuit, a circuit interrupter therefor, an electric discharge device, means responsive to an overload on said circuit for causing said device to pass a current of a magnitude independent of the magnitude of said overload, a condenser, means for varying the charge upon said condenser at a rate determined by said current, and means including a second electric discharge device, responsive to the charge upon said condenser for operating said interrupter when said overload continues for a definite time interval.

6. In a protective system, an electric circuit, a circuit interrupter therefor, a grid glow tube, means responsive to an overload on said circuit for controlling said tube to pass a current of a magnitude independent of the magnitude of said overload, a condenser, means, including a resistor, for varying the charge upon said condenser at a rate determined by said current, and means including an electric discharge device, responsive to the charge upon said condenser, for operating said interrupter when said overload continues for a definite time interval.

7. In a protective system, an electric circuit, a circuit interrupter therefor, a grid glow tube, a resistor, an alternating current source connected in series relationship to said tube and said resistor, means including the grid of said tube for causing said tube to become conducting upon the occurrence of an overload on said circuit, a condenser connected in parallel relationship to said resistor, and means responsive to a predetermined charge upon said condenser for operating said interrupter when said overload continues for a definite time interval.

8. In a protective system, an electric circuit, a circuit interrupter therefor, an electric discharge device having a control element, said device being of a type in which an electric discharge may be started in response to a predetermined electrical condition of the control element and in which the magnitude of the discharge is independent of the electrical condition of the control element, means including said control element for initiating a discharge in said device upon the occurrence of an overload on said circuit and for interrupting said discharge upon the cessation of said overload, and means responsive to cumulative action of said discharge for operating said interrupter if said overload continues for a definite time interval.

9. In a protective system, an electric circuit, a circuit interrupter therefor, an electric discharge tube containing an ionizable medium and having a control element, said tube being of a type in which ionization of said medium is started in response to a predetermined electrical condition of the control element and is maintained by a discharge current in the tube, an alternating current source for energizing said tube, means including said control element for initiating a pulsating discharge in said tube upon the occurrence of an overload on said circuit, and means responsive to cumulative action of said discharge for operating said interrupter if said overload continues for a definite time interval.

In testimony whereof, I have hereunto subscribed my name this 8th day of December, 1930.

SHIRLEY L. GOLDSBOROUGH.